United States Patent
Falkenstein et al.

(10) Patent No.: US 9,403,534 B2
(45) Date of Patent: Aug. 2, 2016

(54) METHOD FOR OPERATING A HYBRID DRIVE DEVICE OF A MOTOR VEHICLE AND HYBRID DRIVE DEVICE AND ELECTRONIC CONTROL UNIT

(75) Inventors: Jens-Werner Falkenstein, Aalen (DE); Thomas Schlipf, Neukirch (DE); Michael Glora, Markgroeningen (DE)

(73) Assignee: ROBERT BOSCH GMBH, Stuttgart (DE)

(*) Notice: Subject to any disclaimer, the term of this patent is extended or adjusted under 35 U.S.C. 154(b) by 1358 days.

(21) Appl. No.: 13/061,414

(22) PCT Filed: Aug. 12, 2009

(86) PCT No.: PCT/EP2009/060420
§ 371 (c)(1),
(2), (4) Date: Aug. 12, 2011

(87) PCT Pub. No.: WO2010/026022
PCT Pub. Date: Mar. 11, 2010

(65) Prior Publication Data
US 2011/0288703 A1     Nov. 24, 2011

(30) Foreign Application Priority Data
Aug. 26, 2008   (DE) .......................... 10 2008 041 565

(51) Int. Cl.
*B60L 11/00*    (2006.01)
*B60W 30/18*    (2012.01)
(Continued)

(52) U.S. Cl.
CPC ............ *B60W 30/18127* (2013.01); *B60K 6/48* (2013.01); *B60K 6/547* (2013.01);
(Continued)

(58) Field of Classification Search
USPC ............ 701/1, 22, 36, 51, 53, 54, 58, 60, 64, 701/65, 66, 67, 68, 70, 82, 83, 84, 87, 90, 701/91, 92, 93, 94, 95, 97, 99; 180/65.21, 180/65.22, 65.225, 65.23, 65.235, 65.24, 180/65.25, 65.26, 65.28, 65.285, 338
See application file for complete search history.

(56) References Cited

U.S. PATENT DOCUMENTS 4,890,686 A * 1/1990 Hamada et al. ............... 180/233
6,005,358 A * 12/1999 Radev ........................... 318/139
(Continued)

FOREIGN PATENT DOCUMENTS

DE    199 45 473    4/2000
DE    199 03 936    5/2000
(Continued)

OTHER PUBLICATIONS

International Search Report for PCT/EP2009/060420, dated Sep. 12, 2009.

*Primary Examiner* — Edward Pipala
(74) *Attorney, Agent, or Firm* — Norton Rose Fulbright US LLP

(57) ABSTRACT

In a method for operating a hybrid drive device of a motor vehicle, which has at least two different drive assemblies, especially an electric machine and an internal combustion engine, that are able to be connected to at least two drive trains of the motor vehicle, during the reconnecting of one of the drive assemblies, particularly from a first to a second of the drive trains, or from the second to the first drive train, and/or during a synchronization, a replacement torque substantially corresponding to the torque produced by the one drive assembly is able to be provided by an additional one of the drive assemblies by the at least partial closing of a clutch.

21 Claims, 1 Drawing Sheet

(51) Int. Cl.

| | |
|---|---|
| *B60K 6/48* | (2007.10) |
| *B60K 6/547* | (2007.10) |
| *B60W 10/02* | (2006.01) |
| *B60W 10/08* | (2006.01) |
| *B60W 10/113* | (2012.01) |
| *B60L 3/00* | (2006.01) |
| *B60L 7/18* | (2006.01) |
| *B60L 7/26* | (2006.01) |
| *B60L 11/14* | (2006.01) |
| *B60L 15/20* | (2006.01) |
| *B60W 20/00* | (2016.01) |

(52) U.S. Cl.
CPC ............... *B60L 3/0023* (2013.01); *B60L 7/18* (2013.01); *B60L 7/26* (2013.01); *B60L 11/14* (2013.01); *B60L 15/2054* (2013.01); *B60W 10/02* (2013.01); *B60W 10/08* (2013.01); *B60W 10/113* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/507* (2013.01); *B60L 2260/26* (2013.01); *B60L 2260/30* (2013.01); *B60L 2270/145* (2013.01); *B60W 20/00* (2013.01); *B60W 2710/105* (2013.01); *Y02T 10/6221* (2013.01); *Y10T 477/26* (2015.01)

(56) References Cited

U.S. PATENT DOCUMENTS

| | | | |
|---|---|---|---|
| 6,506,139 | B2 | 1/2003 | Brandt et al. |
| 6,634,247 | B2 | 10/2003 | Pels et al. |
| 6,712,734 | B1 | 3/2004 | Loeffler |
| 7,493,980 | B2 | 2/2009 | Hidaka |
| 7,755,309 | B2 | 7/2010 | Gebert et al. |
| 2008/0142283 | A1* | 6/2008 | Kluge et al. .......... 180/65.2 |
| 2010/0025131 | A1* | 2/2010 | Gloceri et al. .......... 180/65.28 |
| 2010/0263952 | A1* | 10/2010 | Richter et al. .......... 180/65.275 |

FOREIGN PATENT DOCUMENTS

| | | |
|---|---|---|
| DE | 101 33 695 | 3/2002 |
| DE | 102005032196 | 1/2007 |
| DE | 102005048938 | 4/2007 |
| EP | 0 952 932 | 4/2001 |
| EP | 1 127 230 | 9/2002 |
| EP | 1 717 084 | 11/2005 |
| FR | 2 907 409 | 4/2008 |

\* cited by examiner

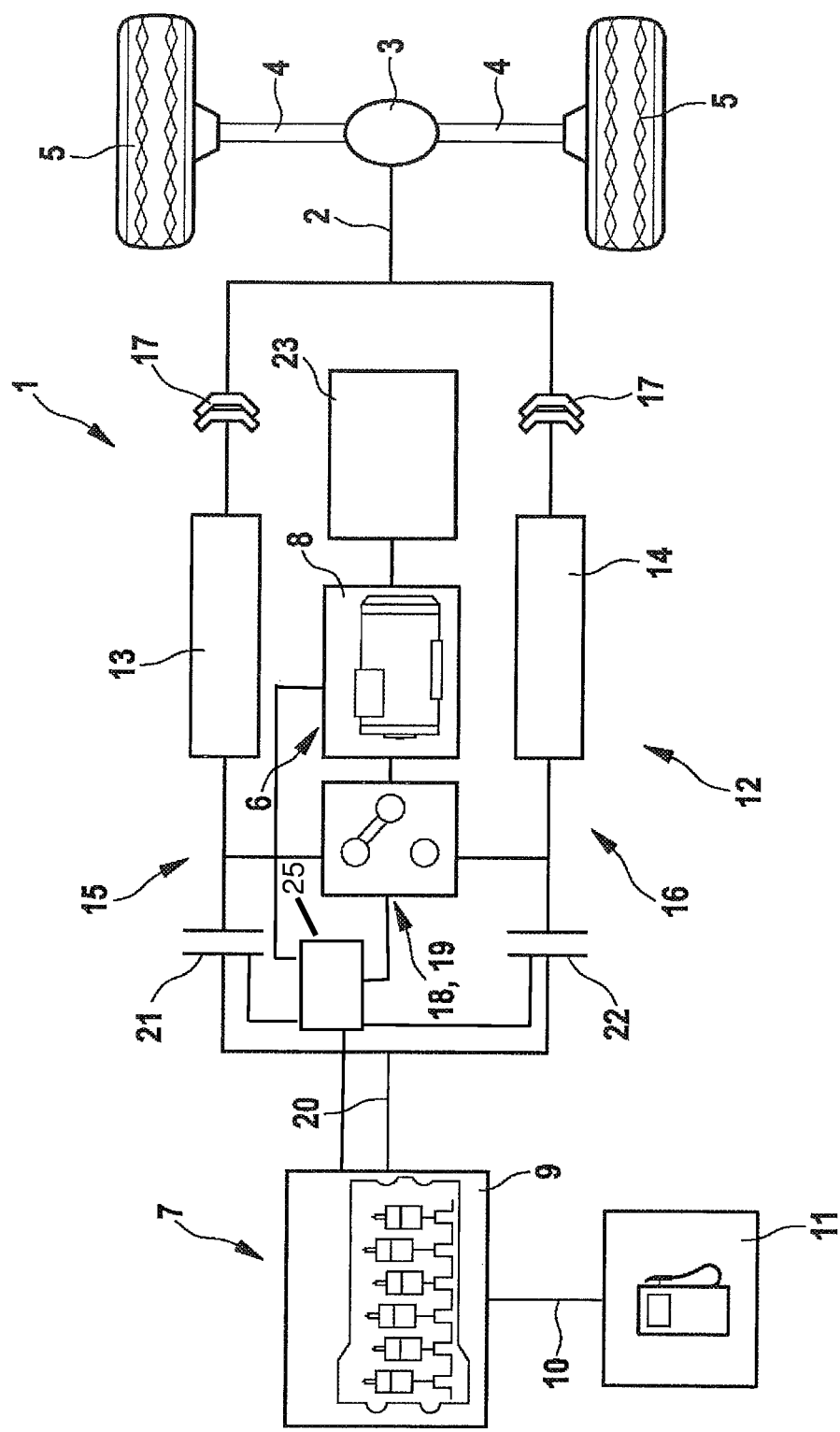

METHOD FOR OPERATING A HYBRID DRIVE DEVICE OF A MOTOR VEHICLE AND HYBRID DRIVE DEVICE AND ELECTRONIC CONTROL UNIT

FIELD OF THE INVENTION

The present invention relates to a method for operating a hybrid drive device of a motor vehicle, which has at least two different drive assemblies, especially an electric machine and an internal combustion engine, that are able to be connected to at least two drive trains of the motor vehicle. Furthermore, the present invention includes a hybrid drive device and an electronic control unit.

BACKGROUND INFORMATION

Certain methods of the kind mentioned at the outset are conventional. One example of the hybrid drive device described is designated as a "torque-split" hybrid. This stipulates a double drive having a first and a second drive train and an output-end drive used for driving the motor vehicle, one of the drive assemblies is able to be coupled with the first or the second drive train, and a further drive assembly being able to be connected, via a first clutch, to the first drive train and/or, via a second clutch, to the second drive train. This arrangement is of advantage, since the different drive assemblies are able to be driven using different rotational speeds, and thus each being able to be operated at optimal efficiency. An additional advantage is that no changes in the drive train of the motor vehicle, which is connected to the output-end drive of the hybrid drive device, have to be undertaken. Thus, the motor vehicle may be equipped first of all using a conventional drive, for instance, based on an internal combustion engine, and may later be converted to a hybrid drive device having at least two different drive assemblies. Because of the connection of the one drive assembly to the first or the second drive train, different transmissions ratios are able to be selected for the one drive assembly. That being the case, the latter may be operated in an optimal operating range and decoupled when necessary. From this, compared to the drive described in German Published Patent Application No. 199 03 936, the advantage comes about that the hybrid drive device is able to be implemented with two drive assemblies. This means that operating modes "boost", "recuperation" and drive that is only possible with the one drive assembly are possible. In addition, no complex components are required, such as electrical components or planetary gears. However, the method described in the publication named, for operating a hybrid drive device of a motor vehicle, has the problem that switching over of the one drive assembly between the first and the second, or the second and the first drive train leads to a brief interruption of a drive torque or a deceleration torque, which has a negative effect on the comfort of the driver of the motor vehicle.

SUMMARY

By contrast, the method described herein has the advantage that switching over takes place without interrupting the drive torque or the output torque of the one drive assembly. This is achieved in that, during the reconnecting of one of the drive assemblies, particularly from a first to a second of the drive trains, or from the second to the first drive train, and/or during a synchronization, a replacement torque substantially corresponding to the torque produced by the one drive assembly is provided by the other drive assembly by at least partially closing a clutch. At least two drive assemblies are provided according to example embodiments of the present invention. These may be connected to at least two drive trains of the motor vehicle that are used to drive the motor vehicle. It may be provided, in this context, that the drive trains be connected to the axles of the motor vehicle by at least one transmission. For example, each drive train may have a transmission or two of the drive trains may be connected to a double transmission, whose output-end drive is connected operatively to the axles. If the one output assembly is to be reconnected or decoupled briefly, for instance, during a shifting process and/or a synchronization process, the torque generated by the one drive assembly drops out and is no longer available for driving the motor vehicle. In this case, a replacement torque is made available by at least partially closing the clutch, which substantially corresponds to the torque of the one drive assembly. In this manner, a continuous and/or steady torque is able to be available for driving the motor vehicle, so that no kind of comfort loss or safety loss is able to occur for the passengers of the motor vehicle. During the synchronization, the one drive assembly is separated from the corresponding drive train, in order to achieve a speed adaptation, for example, after a double shifting process, that is, a shifting process in which at least one gear is skipped.

Example embodiments of the present invention provide a double transmission which has the first and the second drive train and an output-end drive used for driving the motor vehicle. At least two different drive assemblies and one double transmission are provided. The double transmission has a first and a second drive train, which are connected to an output-end drive of the double transmission via transmission devices of the double transmission. In this context, the double transmission has at least one transmission ratio on the first drive train and on the second drive train it has at least one transmission ratio that is different from the first transmission ratio. On the first drive train, for example, the transmission ratios assigned to gears 1, 3, 5 and 7, as well as to one reverse gear, may be situated, while the second drive has transmission ratios for gears 2, 4 and 6. The output-end drive may be connected to at least one axle of the motor vehicle, for example. Thus, on the input side, the double transmission has the first and the second drive train, and on the output side it has the output-end drive.

Example embodiments of the present invention provide that the one drive assembly is assigned to the first drive train and the additional drive assembly is assigned to the second drive train. It may be provided that each of the drive assemblies is assigned to another drive train or another shaft. In this manner, a coupling can take place between the drive assemblies via a subsurface of the motor vehicle that is in contact with its wheels. This arrangement of a hybrid drive device is designated as a "through the road" hybrid.

Example embodiments of the present invention provide that the one drive assembly is able to be coupled to the first or the second drive train. The one drive assembly is able to be coupled with the first or the second drive train, using a dog clutch. This means that, for reconnecting the one drive assembly from the first to the second drive train, or vice versa, the one drive assembly is first decoupled from the first or the second drive train and is then coupled to the second or the first drive train. That is, during the reconnecting, no torque transfer takes place from the one drive assembly to the first or second drive train. It may also be provided that the one drive assembly is durably decoupled from the first and the second drive train. In this case, for instance, a pure operation is possible, using the additional drive assembly.

Example embodiments of the present invention provide that the additional drive assembly is able to be connected via a first clutch to the first drive train and/or via a second clutch to the second drive train. The additional drive assembly is able to be connected via the first clutch to the first drive train and/or via the second clutch to the second drive train. Thus, a torque transmission takes place from the additional drive assembly both to the first and to the second clutch, for example, the first clutch and/or the second clutch being optionally closed, and consequently introducing the torque into the first and/or second drive train. It is provided, for example, that the first clutch is opened and the second clutch is closed, and thus the transmission of the torque from the additional drive assembly to the output-end drive takes place via the first drive train. If a double transmission has been installed, and if a change in the transmission ratio is supposed to occur, the desired transmission ratio is set for the second drive train of the double transmission. Now, the gear change takes place by opening the first clutch and closing the second clutch substantially at the same time. This makes possible a change in transmission ratio without interrupting the torque initiation from the additional drive assembly to the output-end drive. It may also be provided that the first clutch and the second clutch are briefly closed at the same time, i.e. that the opening of the first clutch only takes place as soon as the second clutch is completely closed. It may also be provided that the first and/or the second clutch be partially closed, so that it/they is/are in slip operation, and only a partial transfer of the torque from the additional drive assembly to the drive train is taking place. Thus, it is possible, even during a change in the transmission ratio, to route the torque of the additional drive assembly to the output-end drive without interruption, whereas this is not the case for the first drive assembly.

Example embodiments of the present invention provide that the replacement torque is provided by the at least partial closing of the first and/or the second clutch. If an operation of the motor vehicle takes place, using the one drive assembly, and if a change in the transmission ratio is to take place, there always takes place a brief interruption of the torque transfer from the one drive assembly to the output-end drive. This has a negative effect on the comfort of the driver of the motor vehicle since, during an acceleration or a deceleration of the motor vehicle, the propulsion torque or the deceleration torque are briefly omitted. This is prevented by having the additional drive assembly provide a replacement torque, which substantially corresponds to the torque generated by the one drive assembly. It is initiated by the partial closing of the first and/or the second clutch into the double transmission or into the first and/or the second drive train. In this instance, the first and/or the second clutch may also be closed only partially. This means that only a part of the torque provided by the additional drive assembly is used as replacement torque, and the first or the second clutch is in a slip operation. For example, when there is a deceleration of the motor vehicle and the additional drive assembly is shut down, it may be the case that the deceleration torque provided by the additional drive assembly is greater than the replacement torque required. In this case, only a part of the torque should be used as the replacement torque.

Example embodiments of the present invention provide that it should be used during a deceleration of the motor vehicle, using a braking torque generated by the one drive assembly, whereby the torque corresponds to the braking torque, and the replacement torque corresponding to the torque corresponds to a replacement braking torque. During the deceleration of the motor vehicle, the one drive assembly generates a braking torque, which is conveyed to the output-end drive via the double transmission. During a change in transmission ratio, that is, for instance, when shifting to a lower gear takes place, the one drive assembly has to be reconnected from the first to the second drive train, or from the second to the first. While this is taking place, the braking torque of the one drive assembly briefly drops out, and the braking torque has to be replaced by a replacement torque provided by the additional drive assembly. In this case, the torque corresponds to the braking torque and the replacement torque to the replacement braking torque.

Example embodiments of the present invention provide that the additional drive assembly generate the replacement braking torque using engine braking, exhaust braking and/or compression release braking. The replacement braking torque may be generated by the additional drive assembly, that is, in a different manner. Engine braking is possible, for example, in which the replacement braking torque is provided by an overrun condition, that is, internal frictional forces of the additional drive assembly. Equally possible is exhaust braking, in which an exhaust branch of the additional drive assembly is interrupted, so that the exhaust gas is no longer able to reach the environment. With that, a pressure builds up on the inside of the drive assembly, which opposes the rotation of the drive assembly, whereby it generates the replacement braking torque. A further possibility for generating the replacement braking torque is compression release braking. In the latter, as soon as a piston in a cylinder of the additional drive assembly has reached a top dead center, that is, as soon as it has compressed the air located on the inside to a maximum extent, a valve is opened, so that the compressed air is able to escape from the cylinder. In this manner, the energy stored in the air is dissipated, and thus, because of the pressure that is now lacking, the piston of the cylinder can no longer be pressed in the direction of the bottom dead center. It is, of course, also possible to provide a mechanical brake for generating the replacement braking torque.

Example embodiments of the present invention provide that the replacement torque be set via the partial closing of the first and/or the second clutch, and preferably by activating the additional drive assembly. The level of the replacement torque is able to be set via the partial closing of the first and/or second clutch. If the clutches are closed only partially, a slip operation is at hand and the clutches do not pass on the complete torque delivered by the additional drive assembly, but only a part of it, as replacement torque, to the first and/or second drive train. The replacement torque is preferably set by activating the additional drive assembly. The replacement torque may be made available using engine braking, exhaust braking or compression release braking by the additional drive assembly. If the replacement torque is set by activating the additional drive assembly, the first and/or second clutch may be completely closed. It may also be provided, however, that one should set the replacement torque via a combination of partially closing the first and/or second clutch and the activation of the additional drive assembly. By setting it, the replacement torque is substantially set to the torque generated by the one drive assembly, that is, the latter is as much as possible emulated by the replacement torque.

Example embodiments of the present invention provide that the electric machine be used as the one drive assembly. Thus, the electric machine may be connected to the first or second drive train and be used, for instance, as drive motor and/or as generator, in a recuperation operation, for example.

Example embodiments of the present invention provide that the electric machine be operated as a generator for generating the braking torque. This operation is also denoted as recuperation operation. This means that the deceleration torque is provided, at least in part, in particular completely, by the electric machine. However, it may also be provided that, furthermore, additional braking devices, such as a mechanical brake, be present and used for supporting the electric machine. In recuperation operation, the electric machine is set to a desired or specified braking torque, and as a result, is used in generator operation. The electric energy generated by the generator is able to be fed into the motor vehicle electrical system, or may be stored in an accumulator for later use.

Example embodiments of the present invention provide that a torque present at the first or second drive train and/or present at the output end drive during the reconnecting always represents a braking torque or a propulsion torque. Thus, during deceleration of the motor vehicle, a braking torque should always be present at the first and/or second drive train and/or at the output-end drive, and during acceleration of the motor vehicle, a propulsion torque. This state should be maintained during the entire time period in which the reconnecting takes place. In this manner, the excitation of vibrations in the first and/or second drive train and/or the output-end drive may be avoided. These vibrations are created especially when the torque at the first and/or second drive train and/or the output-end drive varies during the reconnecting, particularly when it drops to zero.

Example embodiments of the present invention provide that the closing of the clutch takes place as a function of thermal stress and/or wear in the corresponding clutch. In order to avoid damage to the first and/or second clutch, it is provided that the closing should be undertaken only when the thermal stress and/or the wear of the corresponding clutch permits it. It may be provided, for example, that one should determine a temperature of the first and/or second clutch and/or the wear of the corresponding clutch. The temperature describes the thermal stress, in this context. If it is determined that the thermal stress and/or the wear of the corresponding clutch are too high, especially that it/they are above a specified boundary value, the replacement torque provided by the additional drive assembly by the partial closing of the first and/or second clutch is reduced. It may also be provided that the first and/or second clutch be closed completely and that the replacement torque be generated by the additional drive assembly, using engine braking, exhaust braking and/or compression release braking or additional suitable measures, so as to reduce the stress in the corresponding clutch.

Example embodiments of the present invention provide that the double transmission and the first and the second clutch form a double clutch transmission. Thus, it is provided that the double transmission and the first and the second clutch form one basic unit, the double clutch transmission.

Moreover, example embodiments of the present invention include a hybrid drive device of a motor vehicle, especially for carrying out the method according to the preceding statements, having at least two different drive assemblies, particularly of an electric machine and an internal combustion engine, which are able to be connected to at least two drive trains of the motor vehicle. It is provided in this instance that, during the reconnecting of one of the drive assemblies, particularly from a first to a second of the drive trains, or from the second to the first drive train, and/or during a synchronization, a replacement torque substantially corresponding to the torque produced by the one drive assembly is provided by the other drive assembly by at least partially closing a clutch. In this context, there is provided a double drive having a first and a second drive train and an output-end drive used for driving the motor vehicle, one of the drive assemblies being able to be coupled with the first or the second drive train, and the additional drive assembly being able to be connected, via a first clutch, to the first drive train or, via a second clutch, to the second drive train. In this case, the output-end drive is used to drive the motor vehicle, which means that a torque that is present at the drive train is passed on to wheels of the motor vehicle. It may be provided that the first and/or second clutch is at least partially closed during the reconnecting and/or synchronization of the one drive assembly. The one drive assembly may be able to be optionally connected, in this instance, to the first or second drive train using a clutching device, for instance, a dog clutch.

Moreover, example embodiments of the present invention include an electronic control device, especially for carrying out the method according to the preceding statements, for controlling a hybrid drive device, particularly according to the preceding statements, having at least two different drive assemblies, particularly of an electric machine and an internal combustion engine, which are able to be connected to at least two drive trains of the motor vehicle. It is provided that, using the control unit during the reconnecting of one of the drive assemblies, particularly from a first to a second of the drive trains, or from the second to the first drive train, and/or during a synchronization, a replacement torque generated by an additional one of the drive assemblies substantially corresponding to the torque generated by the one drive assembly is able to be set by at least partially closing a clutch. Thus, the control unit includes a device for determining the torque generated by the one drive assembly, for controlling and/or regulating the one and/or the additional drive assembly, as well as for setting the clutch. The control unit is preferably provided for controlling and/or regulating the hybrid drive device.

Example embodiments of the present invention will be described in greater detail below with the aid of the drawing.

BRIEF DESCRIPTION OF THE DRAWING

The FIGURE illustrates a hybrid drive device of a motor vehicle having two different drive assemblies and one double transmission.

DETAILED DESCRIPTION

The figure shows a hybrid drive device 1 of a motor vehicle that is not shown. Via an output-end drive 2 and a differential 3, hybrid drive device 1 drives two axles 4 on which wheels 5 of the motor vehicle are situated. Hybrid drive device 1 has a drive assembly 6 and an additional drive assembly 7. Drive assembly 6 is an electric machine 8, drive assembly 7 is an internal combustion engine 9. Internal combustion engine 9 is connected to a fuel tank 11 via a supply line 10, from which fuel is able to get to internal combustion engine 9. In addition, hybrid drive device 1 has a double transmission 12, which is composed of a first sub-transmission 13 and a second sub-transmission 14. First sub-transmission 13 has a first drive train 15 and second sub-transmission 14 has a second drive train 16. Sub-transmissions 13 and 14 each have different transmission ratios. First sub-transmission 13 may have, for instance, transmission ratios required for gears 1, 3, 5, 7 and the reverse gear of the motor vehicle, while second sub-transmission 14 has transmission ratios for gears 2, 4 and 6. This means that the next higher transmission ratio is preferably provided in each case on the other sub-transmission. On the sides of sub-transmission 13 and 14 facing away from drive trains 15 and 16, a transfer takes place of the torque from sub-transmissions 13 and 14 to output-end drive 2. This means that the first and the second drive train 15 and 16 are brought together according to a transmission ratio in first sub-transmission 13 and 14. In order to prevent damage because of possibly present different speeds, in case there is a torque present at both drive trains 15 and 16, a slip clutch 17 is provided in each of first drive train 15 and second drive train 16. Electric machine 8 is able to be connected either to first drive train 15 or second drive train 16 via a clutch 18, which is arranged as a dog clutch 19. This means that a torque generated by electric machine 8 is routed either to first drive train 15 or to second drive train 16. For this purpose, dog clutch 19 is able to be actuated, so that there is either a connection to first drive train 15 or to second drive train 16. An output-end drive 20 of internal combustion engine 9 is able to be connected via a first clutch 21 to first drive train 15 and via a second clutch 22 to second drive train 16. This means that a torque generated by internal combustion engine 9 is usually led either via the first clutch into first drive train 15 or via second clutch 22 into second drive train 16. The leading in of the torque takes place when respective clutch 21 or 22 is closed. If clutches 21 and 22 are open, no torque initialization takes place. If clutches 21 and 22 were simultaneously closed, slip clutches 17 are activated, so that damage may be avoided to double transmission 12 and/or clutches 21 and 22. Electric machine 8 may be operated either in drive mode or in generator mode. Alternatively, dog clutch 19 may be decoupled both from first drive train 15 and drive train 16, and electric machine 8 may stand still. If electric machine 8 is in the generator mode, electrical energy is generated from the energy of motion of the motor vehicle or from at least a part of the drive power of internal combustion engine 9. This electrical energy may be fed via a transformer device 23 to a vehicle electrical system of the motor vehicle, or it may be stored in an accumulator for later use. An electronic control unit 25, by which electric machine 8, internal combustion engine 9, first clutch 21, second clutch 22 and/or dog clutch 19 are able to be actuated, is illustrated in the Figure.

The following function of hybrid drive device 1 comes about, in connection with which a deceleration process of the motor vehicle being drawn and described below: During this, internal combustion engine 9 is shut down, and thus is at a standstill. Clutches 21 and 22 are therefore open. Electric machine 8 is connected via dog clutch 19 to first drive train 15, that is, to first sub-transmission 13. First sub-transmission 13 may have a transmission ratio, for example, that is equivalent to a third gear of the motor vehicle. During the deceleration of the motor vehicle, hybrid drive device 1 is in a recuperation mode, that is, electric machine 8 is being operated as a generator, and thus generates a braking torque. In this context, electric machine 8 generates electrical energy that is made available to the vehicle electrical system of the motor vehicle via transformer device 23. The braking torque acts on output-end drive 2, via double transmission 12 or first sub-transmission 13, and with that on wheels 5 of the motor vehicle. The motor vehicle is braked by this. At the same time, the rotational speed of both output-end drive 2 and drive trains 15 and 16 drops off. Since the aim is to operate electric machine 8 always in an optimal speed range, corresponding to a range in which there is high efficiency, it is thus necessary, beginning at a certain speed decrease, to change the transmission ratio of double transmission 12 in such a way that electric machine 8 is able to be operated at a higher rotational speed level, in spite of the rotational speed of the output-end drive becoming lower. For this purpose, second sub-transmission 14 is prepared such that at this point a transmission ratio is set, which is lower than the currently set transmission ratio of first sub-transmission 13. Subsequently, electric machine 8 is separated via dog clutch 19 from first drive train 15, and with that, from first sub-transmission 13, and is connected to the second drive train, or rather, to second sub-transmission 14. Since there is now a lower transmission ratio, electric machine 8 is again able to be operated in its optimal rotational speed range. During the reconnecting of electric machine 8 from first drive train 15 to second drive train 16, using dog clutch 19, conditioned by the interruption of the deceleration torque generated by electric machine 8, there comes about the failure of the deceleration effect of the motor vehicle. The braking torque, which is generated by electric machine 8, is not passed on to output-end drive 2 for as long as it takes dog clutch 19 to detach the connection of first drive train 15 and to produce a connection to second drive train 16. This failure of the deceleration torque to appear is able to lower the comfort of a driver of the motor vehicle. For this reason it is provided, during the reconnecting of electric machine 8 from first drive train 15 to second drive train 16, or from second drive train 16 to first drive train 15, to generate a replacement torque that essentially corresponds to the torque generated by electrical machine 8. This replacement torque is provided by the at least partial closing of first clutch 21 and/or second clutch 22. As mentioned above, since internal combustion engine 9 is at a standstill, a braking torque is generated by the at least partial closing of clutch 21 or 22. Depending on the desired magnitude of the replacement torque, it may happen, in this instance, that internal combustion engine 9 is cranked along, that is, it is in an overrun condition. In this case, the braking torque is generated, for instance, by the frictional forces inside internal combustion engine 9. If the required braking torque is large, it is conceivable that internal combustion engine 9 generates the replacement torque using exhaust brakes and/or compression release brakes. In this case, first clutch 21 or second clutch 22 may be closed completely. If the required replacement torque is so low that there is no cranking along of internal combustion engine 9, the replacement torque may be set by the partial closing of first clutch 21 or second clutch 22. This means that the replacement torque turns out to be greater, the farther clutch 21 or clutch 22 is closed. The at least partial closing of first clutch 21 or second clutch 22 is carried on until dog clutch 19 has produced a connection of electric machine 8 to first drive train 15 or second drive train 16. Ideally, the control unit 25 activates electric machine 8, internal combustion engine 9, dog clutch 19 and clutches 21 and 22 in such a way that the replacement torque corresponds at all times to the torque produced by the electric machine 8, and the driver of the motor vehicle does not notice thereby the absence of the braking torque.

Furthermore, it may be provided that one should operate both clutches 21 and 22 in slip operation, so as to minimize the energy input and thus also the wear of each individual clutch 21, 22.

The method described may also be used in the case of a double (back) shifting. In this case, drive assembly 6, that is, electric machine 8, does not have to be reconnected, to be sure, but, during the synchronization required for the shifting, it is also not able to introduce any torque into drive train 15 or 16. In this case, it is expedient to select as low a gear as possible on the other sub-transmission 13 or 14, so that a low clutch torque is sufficient for achieving a large torque at wheel 5, which also reduces the wear of the clutch.

In addition, it may be provided that one should establish stress and/or wear of first clutch 21 or second clutch 22, and to actuate these accordingly. For instance, in the case of high stress and/or great wear, or in the case of stress and/or wear exceeding a threshold value, it may be provided that clutches 21 and 22 are closed less far, and consequently, the replacement torque is less than the torque produced by electric machine 8.

Alternatively, the procedure described above may also be used when there is an acceleration of the vehicle with the aid of electric machine 8. In this case, internal combustion engine 9 has to be in an operational state. During a reconnecting of dog clutch 19, internal combustion engine 9 may briefly be operated at an operating point, for example, which is required to ensure a steady propulsion torque, and a propulsion torque is able to be provided via closing clutch 21 or 22.

An example embodiment of the present invention is yielded by separating the effect of the two drive assemblies on different axles of the motor vehicle. In the case of a so-called electrical axle, the internal combustion engine acts on one axle via a transmission, just as in a conventional motor vehicle, and the electric machine acts on an additional axle via an additional transmission. Thus, here too, the braking torque cannot be maintained in response to a shifting process at the electrical, that is, the additional axle, for example, during a deceleration. However, during the shifting, the braking torque may be produced via the one axle and the internal combustion engine.

What is claimed is:

1. A method for operating a hybrid drive device of a motor vehicle, which has at least two different drive assemblies that are connectable to at least two drive trains of the motor vehicle, comprising:
   during at least one of (a) reconnecting one of the drive assemblies one of (i) from a first drive train to a second drive train and (ii) from the second drive train to the first drive train and (b) a synchronization, providing a replacement torque substantially corresponding to a torque produced by one drive assembly by an additional one of the drive assemblies by at least partially closing a clutch.

2. The method according to claim 1, wherein the two different drive assemblies includes an electric machine and an internal combustion engine.

3. The method according to claim 2, wherein the electric machine corresponds to the one drive assembly.

4. The method according to claim 1, wherein a double transmission includes the first drive train, the second drive train, and an output-end drive adapted to drive the motor vehicle.

5. The method according to claim 4, wherein the double transmission and a first clutch and a second clutch form a double clutching transmission.

6. The method according to claim 1, wherein the one drive assembly is assigned to the first drive train and the additional drive assembly is assigned to the additional drive train.

7. The method according to claim 1, wherein the one drive assembly is couplable to at least one of (a) the first drive train and (b) the second drive train.

8. The method according to claim 1, wherein the additional drive assembly is connectable at least one of (a) via a first clutch to the first drive train and (b) via a second clutch to the second drive train.

9. The method according to claim 8, wherein the replacement torque is provided by the at least partial closing of at least one of (a) the first clutch and (b) the second clutch.

10. The method according to claim 8, wherein the replacement torque is set via the partial closing of at least one of (a) the first clutch and (b) the second clutch and by activating the additional drive assembly.

11. The method according to claim 1, wherein the method is performed during a deceleration of the motor vehicle using a braking torque produced by the one drive assembly, wherein the torque corresponds to the braking torque, and the replacement torque corresponding to the torque corresponds to a replacement braking torque.

12. The method according to claim 11, wherein the additional drive assembly generates the replacement braking torque by at least one of (a) engine braking, (b) exhaust braking, and (c) compression release braking.

13. The method according to claim 1, wherein the electric machine is operated as a generator to produce a braking torque.

14. The method according to claim 1, wherein a torque present at least one of (a) the first drive train, (b) the second drive train, and (c) an output-end drive always represents at least one of (a) a braking torque and (b) a propulsion torque during the reconnecting.

15. The method according to claim 1, wherein a closing of a clutch takes place as a function of at least one of (a) a thermal stress and (b) a closing of a corresponding clutch.

16. The method of claim 1, wherein a first one of the drive trains is on a first drive train path, and wherein a second one of the drive trains is on a second drive train path that is parallel to the first drive train path.

17. A hybrid drive device of a motor vehicle, comprising:
   at least two different drive assemblies connectable to at least two drive trains of the motor vehicle;
   wherein during at least one of (a) a reconnection of one of the drive assemblies at least one of (i) from a first drive train to a second drive train and (ii) from the second drive train to the first drive train and (b) a synchronization, a replacement torque substantially corresponding to the torque produced by the one drive assembly providable by an additional one of the drive assemblies by an at least partial closing of a clutch.

18. The hybrid drive according to claim 17, wherein the two different drive assemblies include an electric machine and an internal combustion engine.

19. The hybrid drive of claim 17, wherein a first one of the drive trains is on a first drive train path, and wherein a second one of the drive trains is on a second drive train path that is parallel to the first drive train path.

20. An electronic control unit, for controlling a hybrid drive device of a motor vehicle having at least two different drive assemblies connectable to at least two drive trains of the motor vehicle, comprising:
   an arrangement for setting a replacement torque, during at least one of (a) a reconnection of one of the drive assemblies at least one of (i) from a first drive train to a second drive train and (ii) from the second drive train to the first drive train and (b) a synchronization, generated by an additional one of the drive assemblies substantially corresponding to a torque generated by the one drive assembly by at least partially closing a clutch.

21. The electronic control unit of claim 20, wherein a first one of the drive trains is on a first drive train path, and wherein a second one of the drive trains is on a second drive train path that is parallel to the first drive train path.

* * * * *